United States Patent [19]

Tammen

[11] 4,454,865

[45] Jun. 19, 1984

[54] LIQUID METAL SOLAR POWER SYSTEM

[76] Inventor: Bobby J. Tammen, Rte. 2 - Box 233, Colorado City, Tex. 79418

[21] Appl. No.: 385,786

[22] Filed: Jun. 7, 1982

[51] Int. Cl.$^3$ .............................................. F24J 3/02
[52] U.S. Cl. ................................... 126/438; 126/435; 126/437; 126/443; 126/451
[58] Field of Search ............... 126/419, 422, 432, 435, 126/437, 438, 439, 451, 442, 443, 450, 900; 60/641.11, 641.15

[56] References Cited

U.S. PATENT DOCUMENTS

| 670,916 | 3/1901 | Eneas | 126/270 |
|---|---|---|---|
| 2,182,222 | 12/1939 | Courtis et al. | 126/270 |
| 3,924,604 | 12/1975 | Anderson | 126/270 |
| 3,993,528 | 11/1976 | Pauly | 156/245 |
| 3,998,206 | 12/1976 | Jahn | 126/271 |
| 4,010,732 | 3/1977 | Sawata | 60/641 |
| 4,055,948 | 11/1977 | Kraus | 60/641 |
| 4,098,264 | 7/1978 | Brokaw | 126/438 |
| 4,131,109 | 12/1978 | Coxon | 126/438 |
| 4,173,968 | 11/1979 | Steward | 126/438 |
| 4,184,895 | 1/1980 | Oster | 126/442 |
| 4,238,873 | 12/1980 | Frank | 126/443 |
| 4,286,579 | 9/1981 | Johnston | 126/438 |
| 4,335,706 | 6/1982 | Passarelli | 126/437 |
| 4,373,996 | 2/1983 | Maruko | 126/435 |
| 4,387,574 | 6/1983 | Becker | 126/438 |

Primary Examiner—Daniel J. O'Connor
Attorney, Agent, or Firm—Dennis T. Griggs

[57] ABSTRACT

A solar power system for cogenerating heat and electricity is disclosed. An improved solar collector includes a transparent reflector envelope through which a reflective liquid metal such as mercury is circulated. The liquid metal is preheated as it focuses solar radiation onto the receiver of the collector module. A baffle tube within the receiver is perforated to permit the circulation of working fluid out of the absorption chamber of the receiver into the narrow annulus between the baffle tube and the receiver wall, thereby promoting the rapid generation of vapor. The liquid metal vapor is discharged through the channel of a magnetohydrodynamic generator for producing electrical power in a first power generating stage. The liquid metal vapor is condensed and accumulated in a primary storage reservoir for driving a turbine generator in a second generating stage, thereby providing electrical power during periods of insufficient solar radiation. Liquid metal discharged from the turbine is accumulated in a secondary storage reservoir for supplying the solar collector module during periods of adquate solar radiation.

2 Claims, 3 Drawing Figures

LIQUID METAL SOLAR POWER SYSTEM

BACKGROUND OF THE INVENTION

1. Field of the Invention

This invention relates to solar thermal power generation, and in particular, to an improved focusing solar collector system for cogenerating heat and electricity.

2. Description of the Prior Art

One of the major limiting factors associated with the large scale generation of power using solar energy is the fact that the incident energy density of solar radiation is low, so that solar energy power plants must collect light over a large surface area. Thus, the capital expense for the collecting apparatus and power conversion device is the dominant consideration in determining the ultimate cost per kilowatt hour of electricity, since the sunlight is free. One important effort for developing solar power includes the conversion of thermal energy into electricity by a large number of distributed collectors which employ a moderate degree of concentration. In this approach, the incident solar radiation is enhanced roughly by a factor of fifty to five hundred when focusing reflectors are used, making it possible to obtain operating temperatures over the range of 500° C. to 1,000° C.

A working fluid heated to temperatures in this operating range can be used to produce electric power, for example by generating steam to power a steam turbine electric generator. The concentration of the incident solar radiation to obtain such high operating temperatures is provided by focusing collectors which include a concentrator, a receiver and an absorber, which is usually part of the receiver.

The intense focal energy influx in focusing collectors causes high receiver temperatures and intense thermal radiation. One approach to reducing these losses is to provide a receiver coating material having high absorptivity to solar radiation and low infrared emissivity at the receiver operating temperature. Efficiency has also been increased by choosing a collector geometry which makes the absorbing (irradiated) area large and the emitting area small. By choosing the right combination of receiver surface materials, receiver geometry and heat transfer efficiency, it is possible to operate at high concentration ratios, and extract a high fraction of the incident solar radiation focused on the system by the concentrator.

Even assuming that the distributed collectors are operated at high efficiency, the overall power generation system is limited significantly by the fact that it can operate only during daylight hours. Because of the limited collection period, the power generated can only be used intermittently to augment conventional power generating systems, or some means of storage of the energy must be provided. Additionally, some provision must be made for disposing of the waste heat associated with the power generating operation.

OBJECTS OF THE INVENTION

Because of the high concentration factor, the power density inside of the receiver of a focused collector is relatively high and variable. Because of diurnal and weather induced variations in the incident solar radiation, the receiver is subject to frequent temperature excursions. An important object of the present invention is, therefore, to provide a focused collector assembly in which the effective surface area of the reflector can be varied dynamically to stabilize the receiver power density.

Another object of the invention is to provide a focused collector assembly having improved heat transfer efficiency for the rapid generation of working fluid vapor.

Yet another object of the invention is to provide a solar thermal power generating system utilizing a high efficiency focused collector for the cogeneration of thermal energy and electrical power.

A related object of the invention is to provide a solar thermal power generating system in which thermal energy and electrical power are cogenerated, and in which waste thermal energy is utilized to preheat the working fluid rather than being discharged into the environment.

Another object of the invention is to provide a closed cycle solar power generating system in which electrical power, thermal energy and potential energy are cogenerated during daylight hours, with the potential energy being accumulated during daylight hours, and the stored potential energy being used to drive a turbine generator during periods of insufficient solar radiation.

Still another object of the invention is to provide a closed cycle solar power generating system which utilizes a conductive liquid metal as a working fluid for driving a magnetohydrodynamic generator.

SUMMARY OF THE INVENTION

A solar power system for cogenerating heat and electricity includes an improved solar collector having a transparent reflector envelope through which a reflective liquid metal such as mercury is circulated. The liquid metal defines a reflective surface for focusing solar radiation onto the receiver of the collector module. The effective surface area of the reflector is varied dynamically by controlling the volume of liquid metal working fluid within the transparent reflector envelope, thereby stabilizing the receiver power density. The efficiency of the collector is improved by the preheating effect of the liquid metal as it absorbs heat while reflecting solar radiation onto the receiver.

The efficiency of the collector assembly is further improved by a baffle tube coaxially disposed within a tubular receiver which lies within the focus of the liquid metal envelope reflector. The baffle tube is perforated to permit the circulation of liquid metal working fluid out of the absorption chamber of the receiver into the narrow annulus between the baffle tube and the receiver wall, thereby promoting the rapid formation of vapor.

The liquid metal vapor is discharged through the channel of a magnetohydrodynamic generator for generating electrical power in a first power generating stage. The liquid metal vapor is then circulated through a condenser with liquid metal condensate being accumulated in a primary storage reservoir. Liquid metal from the primary storage reservoir is discharged through a turbine for driving an electrical generator in a second generating stage to provide power during periods of insufficient solar radiation. Liquid metal discharged through the turbine is accumulated in a secondary storage reservoir for supplying the solar collector during those periods when adequate solar radiation is available. The thermal energy cogenerated during operation of the magnetohydrodynamic generator is recovered and transferred in a preheater to the liquid metal which is supplied to the solar collector.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENTS

Figure 1:
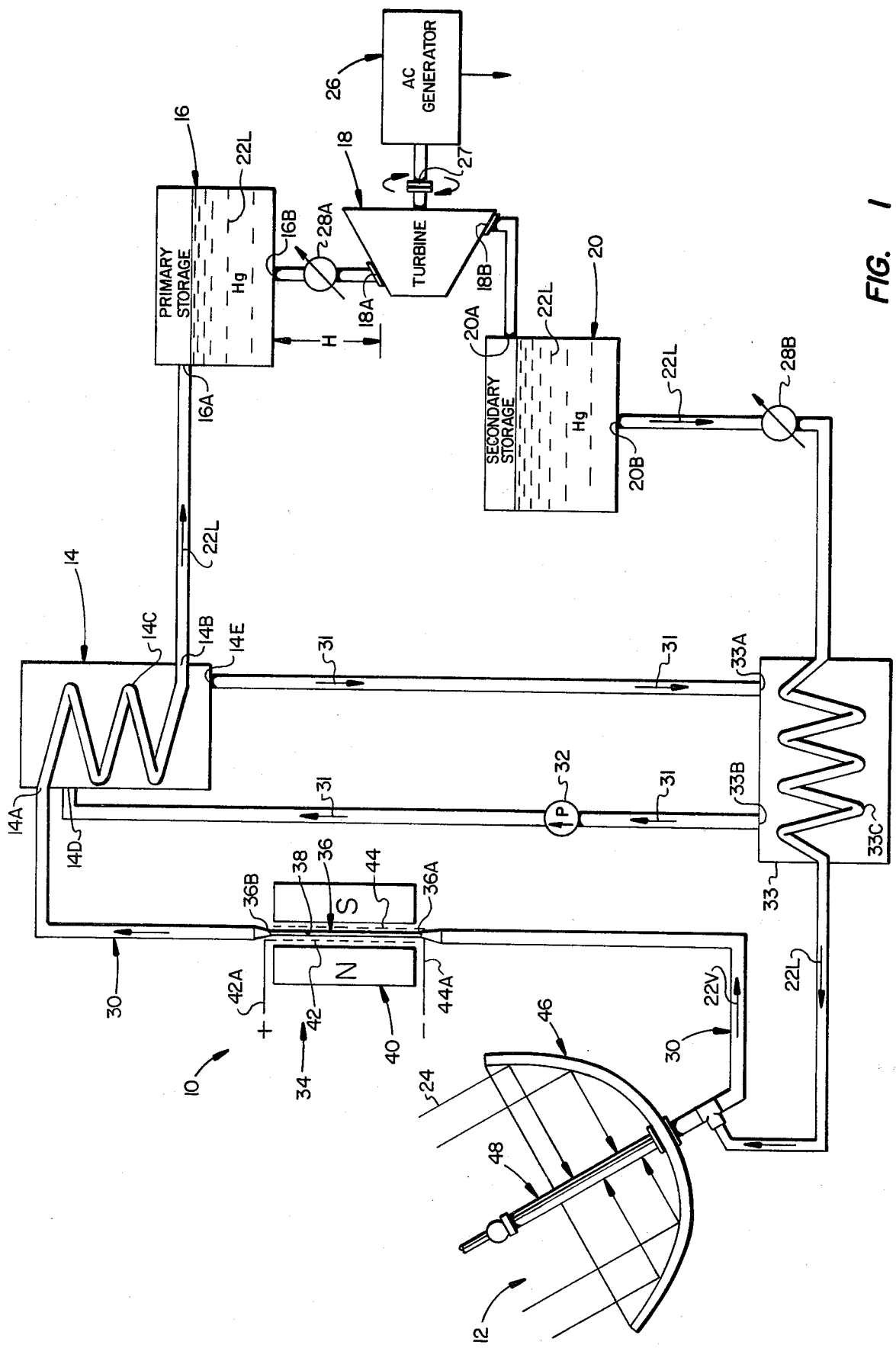
FIG. 1 is a schematic diagram of a solar thermal power generating system.

In the description which follows, like parts are marked throughout the specification and drawings with the same reference numerals, respectively. The drawings are not necessarily to scale, and in some instances proportions have been exaggerated in order to more clearly depict certain features of the invention.

Referring now to FIG. 1, a solar power system 10 for co-generating heat and electricity is illustrated. The principal components of this system are a collector module 12, a condenser 14, a primary storage reservoir 16, a power turbine 18 and a secondary storage reservoir 20. Liquid working fluid 22L is circulated through the collector module 12 where it is heated by the incident solar radiation 24 and converted to working fluid vapor 22V. The vapor 22V is condensed in condenser 14, with the working fluid condensate being stored as potential energy in the primary storage reservoir 22L.

This potential energy is converted to electical energy by discharging the working fluid condensate 22L through the power turbine 18. The power turbine drives an AC generator 26 through a rotary power shaft 27. The rate at which the liquid working fluid 22L is discharged through the turbine 18 is controlled by a flow regulator 28A. The power developed by the turbine 18 is a function of the volume flow rate as set by the flow regulator 28A, the density of the working fluid and the height H of the primary storage reservoir above the turbine inlet port 18A. The liquid working fluid 22L is discharged from the turbine discharge outlet port 18B substantially at atmospheric pressure.

Preferably, the solar power system 10 is a closed cycle system whereby the liquid working fluid 22L can be conserved and continuously recycled. The closed cycle arrangement permits a toxic working fluid such as liquid mercury or sodium potassium alloy to be used safely as the working fluid. Accordingly, the working fluid vapor 22V is conveyed from the collector module 12 through a thermally insulated, high temperature conduit 30 into the condenser inlet port 14A. The insulated conduit 30 is constructed of a high temperature material which is non-reactive with the working fluid, for example a ceramic compound.

A substantial amount of heat is released as the working fluid vapor condenses in the condenser 14. This heat energy may be utilized to satisfy auxillary thermal requirements such as space heating or hot water heating for a building. Alternatively, as illustrated in FIG. 1, the waste heat is recycled in the system by using it to preheat the liquid working fluid 22L as it is admitted into the collector module 12. According to this arrangement, cooling water 31 is circulated by a pump 32 from a preheater 33 to the condenser cooling water inlet port 14D. As it circulates through the condenser, the cooling water 31 absorbs heat from the condenser coil 14C, and after being heated, is circulated through the preheater inlet port 33A. As the heated water 31 circulates over the preheater coil 33C, heat is transferred to the liquid working fluid 22L so that its temperature, as it enters the collector module 12, is substantially above ambient.

Preferably, the liquid working fluid 22L is a conductive liquid metal such as mercury having relatively high density and thermal absorbing capability whereby the vaporized working fluid 22V can drive a magnetohydrodynamic generator 34 for generating electrical power in a first power generating stage.

Figure 3:
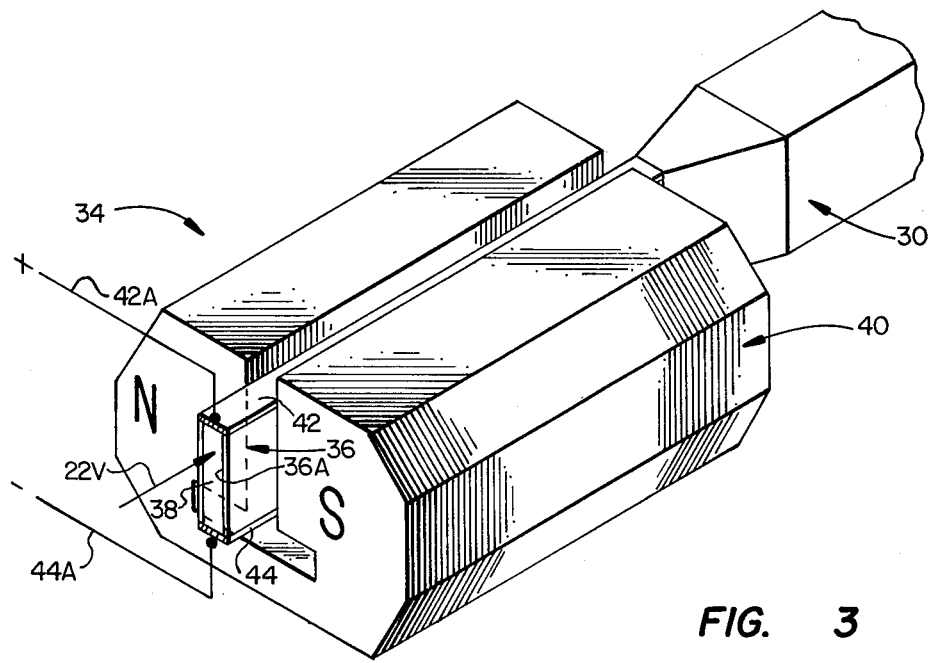

Referring now to FIGS. 1 and 3, the magnetohydrodynamic generator 34 includes a flow channel conduit 36 having an inlet port 36A and a discharge port 36B at opposite ends of a flow channel 38. A high intensity magnetic field is induced across the flow channel 38 by the North and South poles of a permanent magnet 40. Positive and negative electrodes 42, 44 are electrically coupled to the flow channel 38 for conducting an electrical current in response to the flow of a conductive vapor through the flow channel 38. Direct current power is conducted through power conductors 42A, 44A to a bank of storage batteries (not illustrated).

According to the foregoing arrangement, electrical power is produced by the MHD generator as thermal energy is recovered from the working fluid vapor in the condenser 14, and while potential energy is being developed by storage of the working fluid condensate 22L in the primary storage reservoir 16.

According to one preferred operating mode, the MHD generator 34, the condenser 14 and the primary storage reservoir 16 are operated during periods of adequate solar radiation, with the power turbine 18 being shut-down while working fluid condensate is accumulated in the primary storage reservoir 16. According to this arrangement, both electrical power and heat energy are cogenerated during normal daylight operating periods. The collector module 12 is supplied from the secondary storage reservoir 20, with the heat energy recovered in the condenser 14 being utilized for auxillary heating purposes and/or for preheating the liquid working fluid in the preheater assembly 33.

During periods of insufficient solar radiation, the flow regulator 28B between the secondary storage reservoir 20 and the collector module 12 is closed, and the flow regulator 28A on the discharge port 16B of the primary storage reservoir is open to drive the power turbine 18. The cooling water pump 32 is not operated during this operating mode since thermal energy is not cogenerated. The liquid working fluid 22L which drives the turbine 18 is accumulated in the secondary storage reservoir 20 to be supplied to the collector module 12 during the next cogeneration cycle.

Because of its density and conductivity, liquid mercury is an ideal working fluid for use in the solar power generating system 10. Additionally, liquid mercury is highly reflective which makes it useful according to yet another aspect of the invention.

Figure 2:
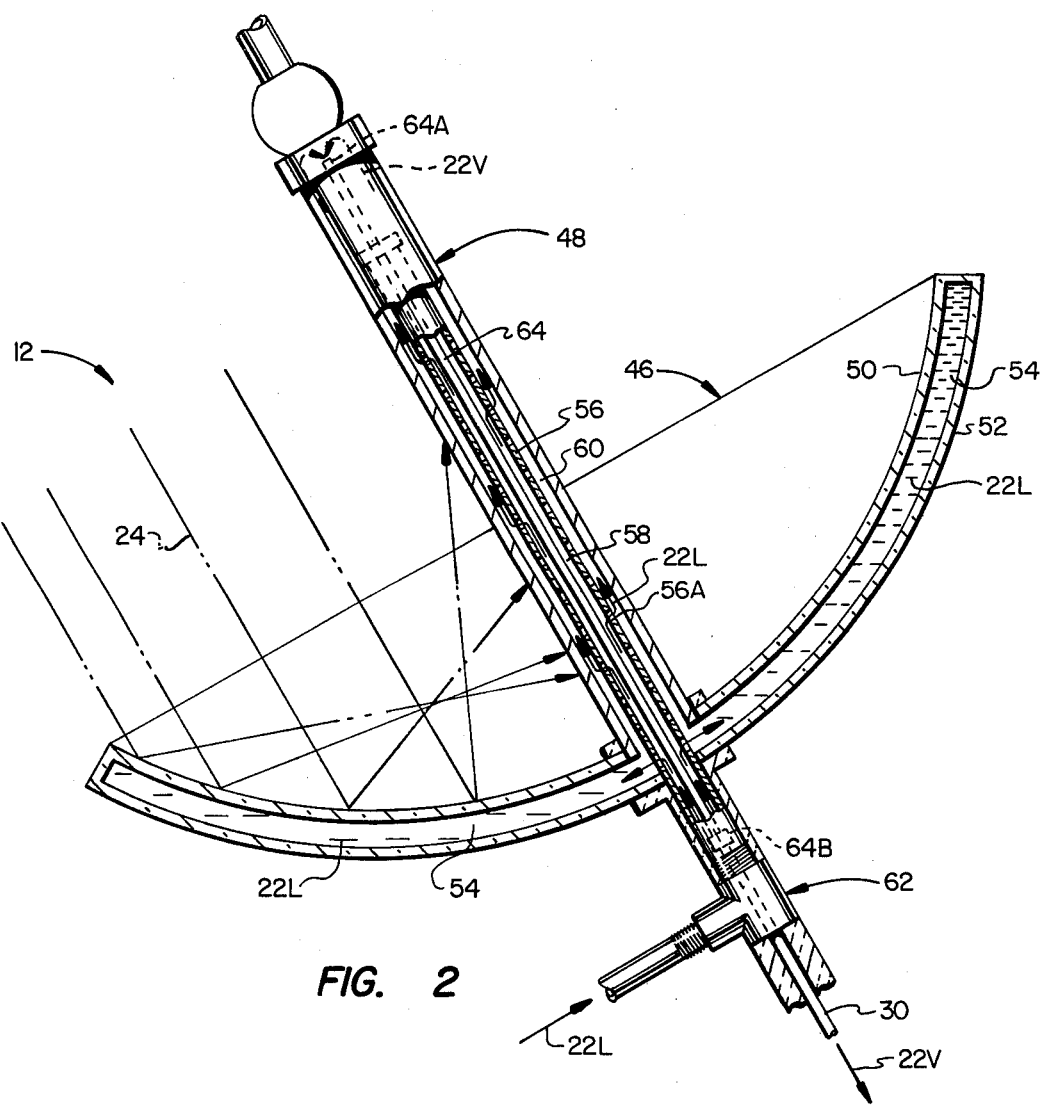
FIG. 2 is an elevation view, partly in section, of an improved focusing collector; and, FIG. 3 is a perspective view, partly in section, of the magnetohydrodynamic generator assembly shown in FIG. 1.

Referring now to FIG. 2, the collector module 12 is a focusing collector assembly having a dish concentrator 46 and a tubular receiver 48 mounted on the dish and disposed within the focus of the dish concentrator. According to an important feature of the invention, the dish concentrator 46 comprises an envelope formed by two closely spaced concave sidewall panels 50, 52 which enclose a fluid chamber 54. The inside concave sidewall panel 50 is made of transparent materials such as glass or plastic.

A volume of reflective working fluid 22L, such as liquid mercury, is received within the fluid chamber 54, and in combination with the transparent concentrator panel 50 defines a reflective surface for focusing solar radiation onto the tubular receiver 48. One advantage of this arrangement is that the liquid mercury, while serving as a reflective surface for the concentrator 46, is preheated by the direct component of the incident solar radiation 24. Another advantage of this arrangement is that the reflective surface area of the concentrator 46 can be varied dynamically during operation to stabilize the receiver power density in response to fluctuations in the incident radiation.

The amount of solar radiation directed onto the receiver 48 is directly proportional to the reflective area of the concentrator 46. The total concentration of solar radiation upon the receiver 48 may be increased or decreased merely by increasing or decreasing the volume of liquid mercury within the concentrator chamber 54. This may be accomplished automatically by using a temperature sensor probe (not illustrated) within the receiver 48 for generating a temperature signal for controlling the flow regulator 28 on the output of the secondary storage reservoir 20. Such control over the power density of the receiver is also useful for sustaining operation in a superheat mode in which the liquid working fluid 22L is heated to a temperature well above its boiling point, or for operation in a two-phase operating mode in which liquid mercury droplets are propelled by vapor through the MHD channel into the condenser 14.

The operation of the system in the MHD electical power generating mode develops a large level of potential energy in the form of liquid working fluid storage. Thus, it is important that the collector module 12 be capable of handling a high working fluid flow rate. The flow rate is limited by the rate at which the liquid working fluid is vaporized. The rate at which the liquid working fluid is vaporized is, of course, a factor which ultimately depends upon the heat transfer efficiency within the receiver.

The heat transfer efficiency is improved in the tubular receiver 48 by a baffle tube 56 which is coaxially disposed within the tubular receiver 48. The baffle tube has a sidewall opening 56A which permits the circulation of liquid working fluid 22L out of the absorption chamber 58 into the narrow annulus 60 which lies between the baffle tube 56 and the receiver sidewall. The concentrator chamber 54 is connected in fluid communication with the absorption chamber 58 and the annulus 60. Liquid working fluid 22L is admitted into the concentrator chamber 54 through an inlet port fitting 62. The liquid working fluid 22L fills the concentrator chamber 54, the absorption chamber 58 and annulus 60 according to the flow rate as established by the flow regulator 28B and by the mass flow rate at which working fluid vapor is discharged out of the collector module.

In some instances, it will be desired to fill the concentrator chamber 54 to the maximum extent possible, thereby maximizing the effective area of surface reflection. The level of liquid mercury within the absorption chamber 58 should be coextensive with the focus of the concentrator 46. Once the desired operating volume level has been reached, the mass flow rate of liquid mercury into the collector module is closely controlled to balance the mass flow rate of vapor. When it is desired to reduce the receiver power density, for example to sustain two-phase generation of vapor and droplets in a relatively narrow temperature operating range, the level of liquid mercury in the transparent concentrator 46 is reduced or increased to compensate for fluctuations in solar intensity to maintain the desired operating temperature level.

The baffle tube 56 enhances the generation of vapor because it maintains a thin film of liquid working fluid in close proximity to the receiver sidewall 48. The working fluid vapor 22V rises to the top of the absorption chamber 58 and is conveyed downwardly through the receiver by a concentrically disposed downcomer tube 64. The downcomer tube 64 has an inlet port 64A disposed in the uppermost region of the absorption chamber, and has a discharge port 64B connected in fluid communication with the high temperature conduit 30. The baffle tube 56 constrains the flow of vapor upwardly through the annulus 60. As the heated working fluid rises, relatively cooler working fluid is emitted into the annulus through the baffle tube sidewall openings 56A. According to this arrangement, the heat from the receiver sidewall 48 is concentrated on a relatively thin, annular column of working fluid.

Although preferred embodiments of the invention have been described in detail, it should be understood that various changes, substitutions and alterations can be made therein without departing from the spirit and scope of the invention as defined by the appended claims.

What is claimed is:

1. A solar power assembly for converting solar radiation to thermal energy comprising, in combination:
    a solar concentrator having a reflector envelope and a fluid chamber enclosed by said envelope, said envelope having a transparent, concave panel forming a sidewall boundary for said chamber and an inlet port for admitting working fluid into said chamber;
    a tubular receiver disposed within the focus of said concave panel, said receiver having an absorption passage connected in communication with said concentrator chamber;
    a volume of liquid working fluid disposed in said concentrator chamber and receiver passage, said liquid working fluid in combination with said transparent concentrator panel defining a reflective surface for focusing solar radiation onto said receiver;
    a condenser having a working fluid passage and a cooling water passage, said working fluid passage having an inlet port connected in fluid communication with the absorption passage of said receiver tube and having an outlet port;
    a working fluid reservoir having an inlet port connected to the outlet port of said condenser, and having an outlet port; and,
    a flow regulator connected in series fluid circuit relation between the outlet port of said working fluid reservoir and the absorption passage of said receiver for controlling the volume of working fluid admitted into said concentrator chamber.

2. The solar power assembly as defined in claim 1, said liquid working fluid comprising mercury.

* * * * *